Patented Apr. 30, 1940

2,199,131

UNITED STATES PATENT OFFICE 2,199,131

PROCESS FOR THE MANUFACTURE OF SIDE-CHAIN AROMATIC COMPOUNDS

Lawrence H. Flett, Hamburg, N. Y., assignor to National Aniline & Chemical Company, Inc., New York, N. Y., a corporation of New York No Drawing. Application July 11, 1938, Serial No. 218,639

16 Claims. (Cl. 260—505)

The present invention relates to a process for the manufacture of aromatic compounds containing alkyl, cycloalkyl or aralkyl side chains. More particularly the invention relates to a process for the manufacture of aromatic compounds containing propyl groups as nuclear substituents, especially propylated naphthalene.

It is an object of the invention to provide a novel process for the manufacture of aromatic compounds containing alkyl, aralkyl, or cycloalkyl side chains, which process can be carried out in a simple manner.

A further object of the invention is to provide a process for the manufacture of propylated aromatic compounds, specifically propylated naphthalene, which process can be carried out in a simple and efficient manner and is free from the disadvantages inherent in the previously known processes for the manufacture of compounds of this type.

Other objects of the invention will in part be obvious and will in part appear hereinafter.

It has been proposed to manufacture alkylated aromatic compounds in various ways. For example, alcohols and alkyl halides have been condensed with aromatic compounds in the presence or absence of condensation catalysts of various types to introduce into the nuclei of the aromatic compounds the alkyl radicals of the aliphatic compounds employed. Although these processes are reasonably well adapted for the preparation of certain classes of alkylated aromatic compounds, in some cases the disadvantages inherent in the processes render their use unsatisfactory. Thus, where an alcohol is used, the condensation reaction results in the formation of water in an amount which is undesirable, whereas in the case of the use of the alkyl halides, particularly the lower alkyl halides, undesirable by-products are often formed which must be separated from the alkylated aromatic compound if a relatively pure product is to be obtained. Particularly in cases where the alkylated products are to be used for the manufacture of wetting agents (by sulfonation), it is desirable that the said products be characterized by a high degree of purity.

It has also been proposed to manufacture thymol by heating a mixture of m-cresol and isopropyl ether in the presence or absence of a condensation catalyst, such as zinc chloride or an activated bleaching earth, at a high temperature and at a superatmospheric pressure. Further, it has been proposed to prepare thymol by passing a vapor mixture of m-cresol and isopropyl ether over a catalyst, such as aluminum oxide, at a temperature of 150° to 350° C. These processes have the disadvantages among others that they require the use of relatively large amounts of heat and apparatus capable of withstanding high pressures or apparatus in which vapor phase contact reactions may be carried out. These processes are difficult and dangerous to operate, while their resultant products, for purposes of manufacturing superior wetting agents, are inferior to those obtained from processes involving the use of alcohols and alkyl chlorides as the alkylating agents.

The present invention is based upon the discovery that an aromatic compound containing an alkyl, aralkyl, or cycloalkyl side chain can be prepared by reacting an aromatic compound with an alkyl ether of the type described more fully hereinafter in the presence of a liquid sulfuric acid condensing agent. It is a feature of the present invention that this reaction can be carried out advantageously at relatively low temperatures; i. e., at temperatures below 100° C. In fact, in accordance with preferred practice, the reaction is carried out at temperatures materially below 100° C. Also, because of the low temperatures preferably employed, the process can be carried out at atmospheric pressure and does not require the use of large amounts of heat or expensive apparatus such as is required in processes which involve high pressures or vapor phase reactions.

It has been found that this process is especially valuable for the preparation of aromatic compounds containing a propyl group or groups as nuclear substituents. For example, propylated naphthalene can be prepared in a simple and efficient manner by reacting naphthalene with a propyl ether in the presence of a liquid sulfuric acid condensing agent such as, for example, sulfuric acid. This process has the advantages that it does not result in the formation of an excessive amount of water or undesirable by-products which are difficult to separate from the desired product. In many cases the products are of such high purity that further purification by distillation is unnecessary. Because of their high purity, when they are converted to wetting agents by sulfonation, the propylated compounds prepared by this process are distinctly superior to the structurally similar products made by sulfonation of propylated compounds prepared from alcohols and propyl chlorides.

As indicated above, the ethers preferably employed in the present process are ethers in which both of the radicals attached to the oxygen atoms are propyl radicals. Of the ethers of this class, isopropyl ether (also termed "di-isopropyl ether") is especially valuable for use in the process in view of the value of the resulting compounds. However, other ethers in which both of the radicals attached to the oxygen atoms are alkyl radicals, particularly acyclic aliphatic radicals containing at least three carbon atoms, and preferably from three to five carbon atoms, may be used in the process. The radicals attached to the oxygen atoms of these ethers may be the same or different. The invention also includes processes wherein the ethers employed are symmetrical or mixed ethers in which the radicals attached to the oxygen atoms are acyclic aliphatic radicals containing less than three carbon atoms, aralkyl radicals, and cycloalkyl radicals. The above ethers are members of the class represented by the following general formula:

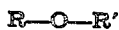

R—O—R' wherein R and R' each represent the same or a different alkyl, aralkyl or cycloalkyl radical. While the ethers employed in the condensation reaction are preferably unsubstituted, ethers containing halogen atoms as substituents may also be employed. The above-described ethers will hereinafter be referred to as members of the class consisting of the alkyl ethers and their halogen derivatives. Additional specific examples of ethers of this class are the following: di-normal butyl ether, di-normal amyl ether, di-isoamyl ether, di-benzyl ether, normal amyl-normal butyl ether, di-cyclohexyl ether.

The aromatic compounds which may be used as starting materials are any of those which have previously been alkylated by the processes referred to hereinabove. Thus, mono- or polynuclear aromatic hydrocarbons, their homologues and substituted derivatives, for example, the substituted or unsubstituted compounds of the benzene, naphthalene, anthracene and diphenyl series, may be used in this connection. Among the substituents which may be present in these compounds there may be mentioned halogen and alkyl, carboxyl, hydroxyl, oxyalkyl, and sulfo groups. The following are specific examples of the aromatic compounds which may be employed in the process: benzene, toluene, xylene, naphthalene, anthracene, diphenyl, phenol, cresol, alpha and beta naphthol, anisole, phenetol, beta naphthol ethyl ether, and salicylic acid. Naphthalene is a preferred material for use in the process because it reacts efficiently with ethers and the resulting side chain naphthalenes are especially valuable compounds.

The liquid sulfuric acid condensing agent can be, for example, sulfuric acid itself, chlorsulfonic acid, or oleum. In most cases, it is preferable to employ sulfuric acid, which for best results should be of at least 85 per cent strength.

The reaction between the aromatic compound and the ether can be carried out in several ways in accordance with the invention. For example, in preparing a propylated aromatic compound according to one manner of proceeding, a propyl ether and the liquid sulfuric acid condensing agent; e. g., strong sulfuric acid, are mixed in a suitable vessel, preferably a vessel fitted with a reflux condenser. The resulting mixture is maintained at a temperature adapted to effect condensation between the ether and the aromatic compound, which, as before stated, is below 100° C., and the aromatic compound, preferably naphthalene, is then introduced into the mixture. The mixture prepared in this way is maintained at the reaction temperature for a period of time sufficient to permit completion of the reaction. The reaction products in the mixture are aromatic compounds having one or more side chains corresponding to the propyl radicals of the ether used in the reaction. (In this connection, it will be understood that in stating that the side chains of the resulting aromatic compounds correspond to the radical or radicals of the ethers, it is not meant that the side chains are necessarily identical with these radicals since it may be that the aromatic nuclei are attached to different carbon atoms of these radicals from the carbon atoms to which the oxygen atoms of the ethers were attached.) In cases where the aromatic compound employed as the starting material is unsulfonated and is not sulfonated in the reaction, the reaction products are preferably separated from the remainder of the reaction mixture by settling the mixture with the addition of some water if necessary until it separates into a lower layer of acid, which is withdrawn, and an upper oily layer. The oily layer comprising a mixture of propylated aromatic compounds can be used without further treatment for certain purposes; e. g., for the manufacture of a mixture of propylated aromatic sulfonic acids. If desired, however, the oily layer can be freed of acid and distilled to obtain a selected fraction, comprising a purified mixture of propylated aromatic compounds.

The process may also be carried out by mixing the reacting materials in other ways since the order of addition of the materials is not a controlling condition of the present process. For example, in certain cases the sulfuric acid is added to a mixture of the ether and aromatic compound. If the mixture of the ether and the liquid sulfuric acid condensing agent is added to the aromatic compound, it is desirable to mix the aromatic compound with a portion of the condensing agent before the ether mixture is added thereto.

Although the sulfonation of the side chain aromatic compounds is not a part of the present invention, more or less sulfonation of these compounds can be effected in the course of the condensation reaction by suitable additions of a sulfonating agent initially, during, or after the condensation, or at any convenient stage or stages of the condensation. Conveniently, the sulfonating agent is identical with the liquid sulfuric acid condensing agent. For example, a mixture of side-chain aromatic sulfonates can be prepared by reacting a suitable aromatic compound; e. g., naphthalene, with a sulfonating agent, such as concentrated sulfuric acid, and then adding this sulfonation mass to a previously prepared mixture of ether and concentrated sulfuric acid to form a condensation reaction mixture. During the addition of the sulfonation mass the mixture of ether and sulfuric acid is preferably at a temperature adapted to effect condensation between the sulfonated aromatic compound and the ether, and this temperature is maintained, after the addition of the sulfonation mass is completed, for a period of time sufficient to complete the reaction. The reaction product, comprising a mixture of side-chain aromatic sulfonic acids, is then separated from the remainder of the reaction mixture in any convenient manner. For example, the mixture may be drowned in cold water, limed, and sodated in the usual manner, the filtered aqueous solution containing the side-chain aromatic sulfonates, being then evaporated to dryness.

In order that the invention may be more fully understood, reference should be had to the following specific examples in which are described preferred ways of practicing the invention. It will be understood that these examples are given for illustrative purposes only and are not intended as limitations of the invention. The parts are by weight and the temperatures in degrees centigrade.

*Example 1.*—2530 parts of 93 per cent sulfuric acid in a suitable vessel (preferably one fitted with a reflux condenser open to the atmosphere) while being rapidly agitated, are cooled and maintained at a temperature of 20° to 30° while 1344 parts of isopropyl ether are added slowly to the acid. The mixture is heated to 80° to 85° and maintained at this temperature while 1536 parts of naphthalene, preferably in solid form, are added over a period of about 2 hours. After the last addition of naphthalene, the mixture is agitated at 80° to 85° for about one and a half hours. The mixture is then cooled to 15° to 30°, the agitation is stopped, and the mass is permitted to stand until it has separated into two well-defined layers. The lower layer of spent acid is withdrawn from the upper layer of oil, which is substantially isopropylated naphthalenes. The separated oil can be used directly for the manufacture of a mixture of isopropylated naphthalene sulfonic acids or their salts, or it can be freed of adhering acid and distilled before further processing. The crude oil is a dark brown liquid which is insoluble in water. Upon distillation, the fraction of oil which is collected between 120° and 200° at 20 mm. of mercury absolute pressure, is a light amber-colored liquid. It is a mixture of isopropylated naphthalenes.

*Example 2.*—128 parts of naphthalene and 112 parts of isopropyl ether are mixed at 15° to 30°. The mixture is heated in a vessel fitted with an agitator and reflux condenser to 70° to 80°. To this mixture, while maintaining the temperature thereof at 70° to 80°, 211 parts of 93 per cent sulfuric acid are slowly added over a period of about three quarters of an hour. The mixture is agitated thereafter at a temperature of 70° to 80° for about one and a half hours, and is then run into a convenient amount of cold water. The diluted mixture is allowed to settle, and the lower layer of aqueous spent acid is withdrawn. The upper layer of oil, which is a mixture containing mono- and poly-isopropylated naphthalenes, is further treated as indicated in Example 1. The weight yield of isopropylated naphthalene which is obtained by this method is relatively lower than that obtained by the process of Example 1.

*Example 3.*—In a suitable reactor which is fitted preferably with a reflux condenser, 112 parts of isopropyl ether are added slowly to 156 parts of 66° Bé. sulfuric acid, while the mixture is agitated and maintained at about 50°. In another vessel, 128 parts of naphthalene are stirred rapidly into 210 parts of 66° Bé. sulfuric acid. This mixture is warmed rapidly to about 160° and maintained there for about 15 minutes or until a sample is completely soluble in aqueous alkali. The sulfonated naphthalene charge is then added to the mixture of ether and sulfuric acid, over a period of time, so that the temperature of the reaction mass reaches and is conveniently maintained, during the addition and for about one hour thereafter, at 90° to 95°. The mixture is then drowned in cold water, limed and sodated in the usual manner and the filtered aqueous solution which contains chiefly sodium isopropylated naphthalene sulfonates is evaporated to dryness. The final product is a brown-yellow to white friable solid which is chiefly a mixture of sodium isopropylated naphthalene sulfonates. It is readily soluble in water. The wetting and emulsifying properties of its aqueous solutions are superior to those of similar solutions which are made from sodium isopropyl naphthalene sulfonate prepared by other well-known processes.

*Example 4.*—In a suitable reactor which is fitted preferably with a reflux condenser, 130 parts of di-normal butyl ether are stirred slowly into 210 parts of 66° Bé. sulfuric acid while the mixture is maintained at about 60°. When the addition of ether is complete, the temperature of the mass is raised slowly to 90° to 95°, then 128 parts of naphthalene are stirred into the mixture, and the whole mass is agitated at 90° to 95° for about 4 hours. The mass is then cooled to 20° to 25° and allowed to stand. After a short settling period the mixture separates into a lower layer of acid which is withdrawn, and an upper layer of light-brown oil which is chiefly a mixture of butylated naphthalene compounds. It is washed with water until free of acid, and dried or distilled, or further processed as desired.

The oil is lighter than, and insoluble in, water. Upon being sulfonated in the usual manner, it forms butylated naphthalene sulfonic acid which has the wetting and emulsifying properties of butylated naphthalene sulfonic acid prepared by other known processes. Butylated naphthalene sulfonic acid which is made in this manner is superior in appearance and wetting action to that made by condensing butyl alcohol and naphthalene sulfonic acid.

*Example 5.*—In a suitable reactor fitted with a reflux condenser, 112 parts of isopropyl ether are added slowly to 211 parts of 93 per cent sulfuric acid while the temperature of the agitated mixture is maintained at 20° to 30°. When the mixture is complete, the temperature is raised to about 60°, and the liquid is added slowly to a previously prepared mixture of 128 parts naphthalene and 106 parts of 93 per cent sulfuric acid, which is maintained throughout at 75° to 85°. The final alkylation mixture is agitated at 75° to 85° for 1.5 to 2 hours, after which it is cooled to 15° to 30° or poured into a convenient amount of cold water. After a period of settling, the lower layer of spent acid is withdrawn from the mixture, and the upper layer of oil is recovered and treated as indicated in Example 1.

*Example 6.*—In a suitable reactor fitted with a reflux condenser, 112 parts of isopropyl ether are added gradually to 196 parts of sulfuric acid monohydrate, while the agitated mixture is maintained at 20° to 30°. The mixture, when complete, is warmed to 60° to 70°, and 78 parts of benzene are added thereto slowly, over a period of 1.5 to 2 hours, while the temperature of 60° to 70° is maintained. The mixture is stirred for about 2 hours longer. It is then diluted with a convenient amount of cold water, and allowed to stand and settle until the lower layer of spent acid can be withdrawn from the upper separated oily layer which consists of a mixture of isopropylated benzenes. The crude mixture of isopropylated benzenes is a dark-brown oil which is insoluble in water. This oil is distilled in vacuo and the fraction collected between 80° and 145° at 22 mm. of mercury absolute pressure, is a light, very pale yellow oil which comprises mono- and di-isopropyl benzene.

*Example 7.*—90 parts of water are mixed with 1150 parts of sulfuric acid monohydrate in a suitable reactor equipped with an agitator and vent. The mixture is agitated and cooled to 15°. 495 parts of isopropyl ether are added over a period of three quarters of an hour as the temperature is allowed to rise to 45° to 50°. 775 parts of ground naphthalene are then added and the mixture is agitated at 40° to 50° for 3 hours. 165 parts of isopropyl ether are added over a period of one half hour keeping the temperature below 50°. The batch is then agitated at 50° to 60° for 10 hours. The agitator in the reactor is stopped and the mix is allowed to settle for at least 4 hours. The lower layer of spent acid is separated. The upper layer is an oil containing mono- and poly-isopropylated naphthalene, but is largely di-isopropylated naphthalene. Upon sulfonation without further purification, followed by liming, sodation and drying, an almost white, excellent wetting agent is obtained comprising chiefly the sodium salts of the sulfonated di-isopropylated naphthalene compounds.

The procedure described in the foregoing examples may be varied so as to produce a wide variety of side-chain aromatic compounds. Thus, by substituting for the aromatic compounds employed in the foregoing examples, any other aromatic compound previously employed for alkylation and similar condensation reactions; e. g., any of the aromatic compounds hereinbefore mentioned, other aromatic compounds containing similar side chains can be prepared.

It will be understood that the reaction conditions referred to in the examples can be varied widely within the scope of the invention since these examples merely describe representative procedures. In using other alkyl ethers of the class disclosed above in the process, the specific temperatures, proportions of reactants, and other conditions ordinarily will vary from the specific conditions of the examples. Further, the experiments leading to the development of the present invention have indicated that by varying the reaction conditions when using a particular alkyl ether, the extent to which side chains are introduced into the aromatic compound can be varied. Thus, the extent of this introduction may be controlled by varying the proportions of ether and aromatic compounds employed, and/or the amount and strength of the liquid sulfuric acid condensing agent, and/or the temperature and the time of the reaction. For example, the extent of introduction of side chains into the aromatic compound can be increased by increasing the amounts of ether and liquid sulfuric acid condensing agent in proportion to the amount of aromatic compound subjected to treatment. When reacting one mol of an aromatic compound with about one mol of an alkyl ether, it is generally desirable to employ about two mols or more of sulfuric acid or an equivalent amount of another liquid sulfuric acid condensing agent.

As before stated, the condensation reaction is preferably carried out by maintaining the reaction mixture at a temperature below 100° C. for a period of time sufficient to complete the reaction, ordinarily from one-half to 24 hours after the reaction mixture is prepared. For efficient operation, the reaction temperature ordinarily should not be lower than 20° C. and preferably should be between 40° and 100° C.

Since certain changes may be made in the above processes without departing from the scope of the invention, it is intended that the description shall be interpreted as illustrative and not in a limiting sense.

I claim:

1. In the process of preparing an aromatic compound containing an alkyl side chain, wherein the aromatic compound is condensed with a compound containing a radical corresponding to the side chain, the improvement which comprises condensing the aromatic compound at a temperature below 100° C. with an ether of the class consisting of the alkyl ethers and their halogen derivatives in the presence of a liquid sulfuric acid condensing agent.

2. In the process of preparing an aromatic compound containing an alkyl side chain, wherein the aromatic compound is condensed with a compound containing a radical corresponding to the side chain, the improvement which comprises condensing the aromatic compound at a temperature below 100° C. with an alkyl ether in the presence of a liquid sulfuric acid condensing agent.

3. In the process of preparing an aromatic compound containing an alkyl side chain, wherein the aromatic compound is condensed with a compound containing a radical corresponding to the side chain, the improvement which comprises condensing the aromatic compound at a temperature below 100° C. with an alkyl ether containing at least three carbon atoms in an alkyl group in the presence of a liquid sulfuric acid condensing agent.

4. In the process of preparing an aromatic compound containing an alkyl side chain, wherein the aromatic compound is condensed with a compound containing a radical corresponding to the side chain, the improvement which comprises condensing the aromatic compound at a temperature below 100° C. with a propyl ether in the presence of a liquid sulfuric acid condensing agent.

5. In the process of preparing an aromatic compound containing an alkyl side chain, wherein the aromatic compound is condensed with a compound containing a radical corresponding to the side chain, the improvement which comprises condensing the aromatic compound at a temperature below 100° C. with an ether of the class consisting of the alkyl ethers and their halogen derivatives in the presence of sulfuric acid.

6. In the process of preparing an aromatic compound containing an alkyl side chain, wherein the aromatic compound is condensed with a compound containing a radical corresponding to the side chain, the improvement which comprises condensing the aromatic compound at a temperature below 100° C. and at atmospheric pressure with an alkyl ether in the presence of sulfuric acid of at least 85 per cent strength.

7. In the process of preparing an aromatic compound containing an alkyl side chain, wherein the aromatic compound is condensed with a compound containing a radical corresponding to the side chain, the improvement which comprises condensing the aromatic compound at a temperature between 20° and 100° C. with an ether in which both of the radicals attached to the oxygen atom are acyclic aliphatic radicals containing at least three carbon atoms in the presence of sulfuric acid of at least 85 per cent strength.

8. In the process of preparing an aromatic compound containing an alkyl side chain, wherein the aromatic compound is condensed with a compound containing a radical corresponding to the side chain, the improvement which comprises condensing the aromatic compound at a temperature between 20° and 100° C. with a propyl ether in the presence of sulfuric acid of at least 85 per cent strength.

9. In the process of preparing an aromatic compound containing an alkyl side chain, wherein the aromatic compound is condensed with a compound containing a radical corresponding to the side chain, the improvement which comprises mixing an ether of the class consisting of the alkyl ethers and their halogen derivatives with sulfuric acid, introducing the aromatic compound into the resulting mixture to form a condensation reaction mixture, and maintaining the condensation reaction mixture at a temperature between 40° and 100° C. until the formation of a side-chain aromatic compound.

10. The process of preparing an aromatic compound selected from the group consisting of the aromatic compounds of the benzene and naphthalene series containing an alkyl side chain, which comprises forming a mixture of an alkyl ether, containing three to five carbon atoms in an alkyl group, sulfuric acid of at least 85 per cent strength, and an aromatic compound selected from the group consisting of benzene and naphthalene, maintaining the mixture at a temperature between 40° and 100° C. and at atmospheric pressure until the formation of a side-chain aromatic compound.

11. The process of preparing an aromatic compound selected from the group consisting of the aromatic compounds of the benzene and naphthalene series containing a propyl side chain, which comprises forming a mixture of isopropyl ether, sulfuric acid of at least 85 per cent strength, and an aromatic compound selected from the group consisting of benzene and naphthalene, maintaining the mixture at a temperature between 40° and 100° C. and at atmospheric pressure until the formation of a propylated aromatic compound, and recovering the propylated aromatic compound.

12. The process of preparing a naphthalene compound containing an alkyl side chain, which comprises condensing naphthalene with an alkyl ether in the presence of a liquid sulfuric acid condensing agent.

13. The process of preparing a naphthalene compound containing an alkyl side chain, which comprises condensing naphthalene at a temperature between 40° and 100° C. with an ether in which both of the radicals attached to the oxygen atom are acyclic aliphatic radicals containing at least three carbon atoms in the presence of sulfuric acid.

14. The process of preparing a naphthalene compound containing a propyl side chain, which comprises condensing naphthalene at a temperature below 100° C. with isopropyl ether in the presence of a liquid sulfuric acid condensing agent.

15. The process of preparing a naphthalene compound containing a propyl side chain, which comprises forming a mixture of isopropyl ether, sulfuric acid of at least 85 per cent strength, and naphthalene, heating the mixture at a temperature between 40° and 100° C. and at atmospheric pressure until the formation of a propylated naphthalene compound.

16. The process of preparing a naphthalene compound containing a propyl side chain which comprises forming a condensation reaction mixture comprising isopropyl ether, sulfuric acid of about 100 per cent strength, and naphthalene by a procedure involving the addition of the naphthalene to a mixture of isopropyl ether and the sulfuric acid, and maintaining the condensation reaction mixture at a temperature between 40° and 100° C. until the formation of a propylated naphthalene compound.

LAWRENCE H. FLETT.